(12) United States Patent
Bickel

(10) Patent No.: US 6,910,323 B2
(45) Date of Patent: Jun. 28, 2005

(54) HARVESTER TINE AND BAT ASSEMBLY

(75) Inventor: Donald W. Bickel, Peru, IL (US)

(73) Assignee: HCC, Inc., Mendota, IL (US)

( * ) Notice: Subject to any disclaimer, the term of this patent is extended or adjusted under 35 U.S.C. 154(b) by 0 days.

(21) Appl. No.: 10/336,392

(22) Filed: Jan. 3, 2003

(65) Prior Publication Data
US 2003/0126848 A1 Jul. 10, 2003

Related U.S. Application Data

(60) Provisional application No. 60/346,583, filed on Jan. 8, 2002.

(51) Int. Cl.$^7$ .............................................. A01D 57/00
(52) U.S. Cl. ......................................... 56/220; 56/400
(58) Field of Search ......................... 56/16.1, 220, 364, 56/400

(56) References Cited

U.S. PATENT DOCUMENTS

| | | | |
|---|---|---|---|
| 1,794,646 A | * | 3/1931 | Schueler ...................... 56/220 |
| 3,096,609 A | | 7/1963 | Garrett et al. |
| 3,102,377 A | | 9/1963 | Garrett |
| 3,468,109 A | * | 9/1969 | Reimer ........................ 56/220 |
| 3,616,631 A | | 11/1971 | Quam |
| 3,626,678 A | | 12/1971 | Quam |
| 3,698,172 A | | 10/1972 | Johnston |
| 3,796,030 A | * | 3/1974 | Neal et al. ..................... 56/220 |
| 4,128,918 A | | 12/1978 | Wenk |
| 4,520,620 A | | 6/1985 | Gessel et al. |
| RE32,522 E | | 10/1987 | Fishbaugh |
| 4,706,448 A | * | 11/1987 | Gessel et al. ................. 56/400 |
| 4,882,899 A | | 11/1989 | Jasper et al. |
| 4,901,511 A | | 2/1990 | Yarmashev et al. |
| 5,271,213 A | | 12/1993 | von Allwoerdan |
| 5,474,268 A | * | 12/1995 | Yu .............................. 248/61 |
| 5,551,221 A | | 9/1996 | Sund |
| 5,595,052 A | * | 1/1997 | Jasper et al. .................. 56/220 |
| 6,199,357 B1 | | 3/2001 | Bloom |
| 6,199,358 B1 | | 3/2001 | Majkrzak |
| 6,324,823 B1 | * | 12/2001 | Remillard ..................... 56/220 |

FOREIGN PATENT DOCUMENTS

| | | |
|---|---|---|
| DE | 4028885 | 3/1992 |
| DE | 4109451 | 9/1992 |
| EP | 0475405 | 6/1994 |

* cited by examiner

Primary Examiner—Thomas B. Will
Assistant Examiner—Alicia Torres
(74) Attorney, Agent, or Firm—Michael Best & Friedrich LLP

(57) ABSTRACT

A combination for a harvester pickup reel, a harvester tine, and a method of assembling a pickup reel. In some aspects, the combination for a harvester pickup reel comprises a shaft, a tine supportable on the shaft for rotation with the shaft, and a fastener assembly integrally formed on one of the shaft and the tine. In other aspects, the combination for a harvester pickup reel comprises a shaft, a tine supportable on the shaft for rotation with the shaft and a fastener assembly. In such aspects, the fastener assembly comprises a first fastener member including a projection and a second fastener member defining a recess, the projection being insertable into the recess. In some aspects, the harvester tine comprises a support portion connectable with the second shaft to support the tine for rotation with the second shaft, the support portion being connectable to the second shaft without separate fasteners. In other aspects, the harvester tine comprises a support portion connectable with the second shaft to support said tine for rotation with the second shaft and a fastener assembly integrally formed with the support portion and engageable to connect the support portion to the second shaft.

38 Claims, 7 Drawing Sheets

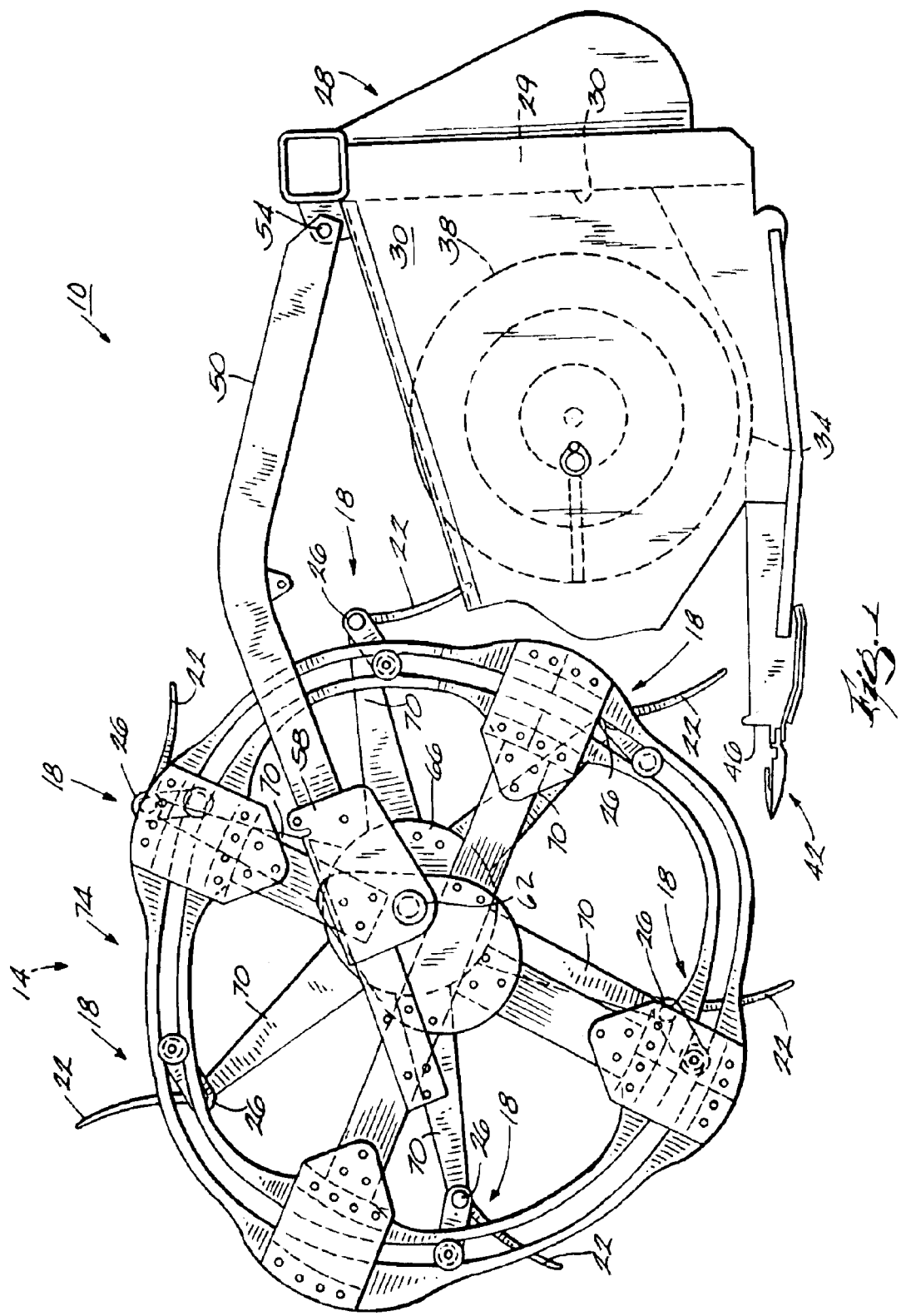

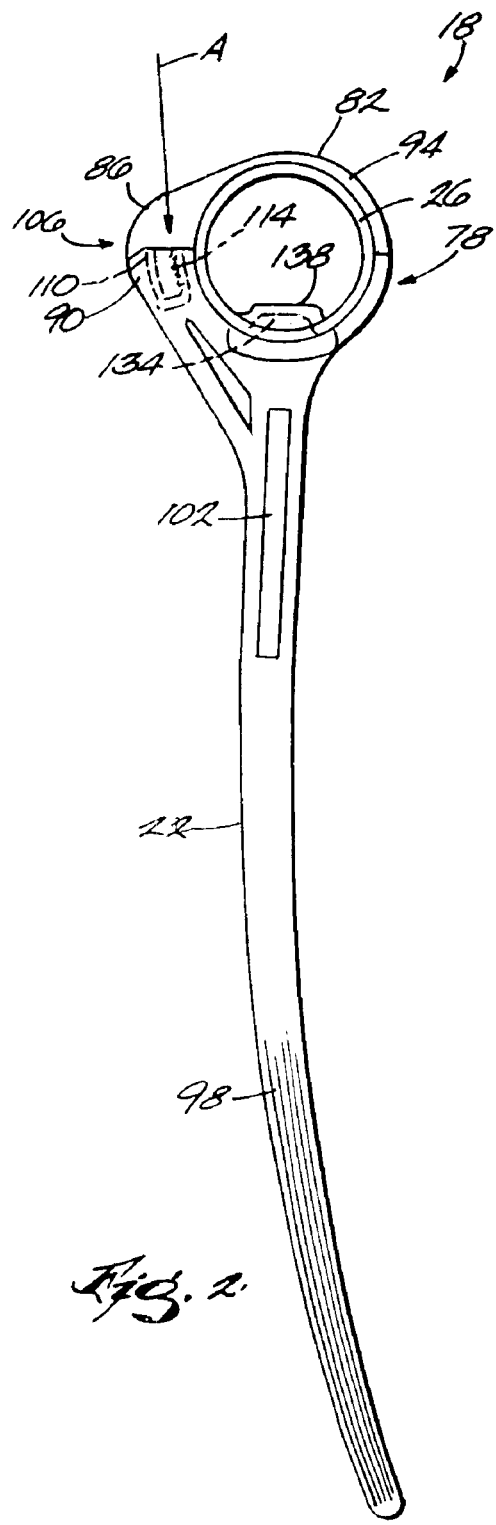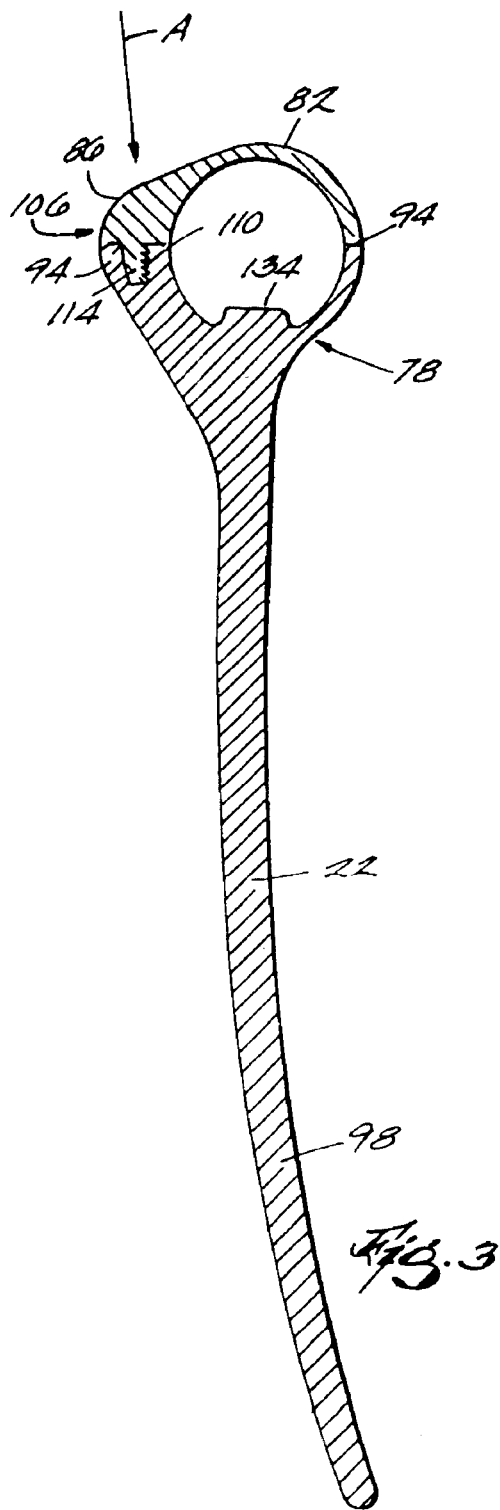

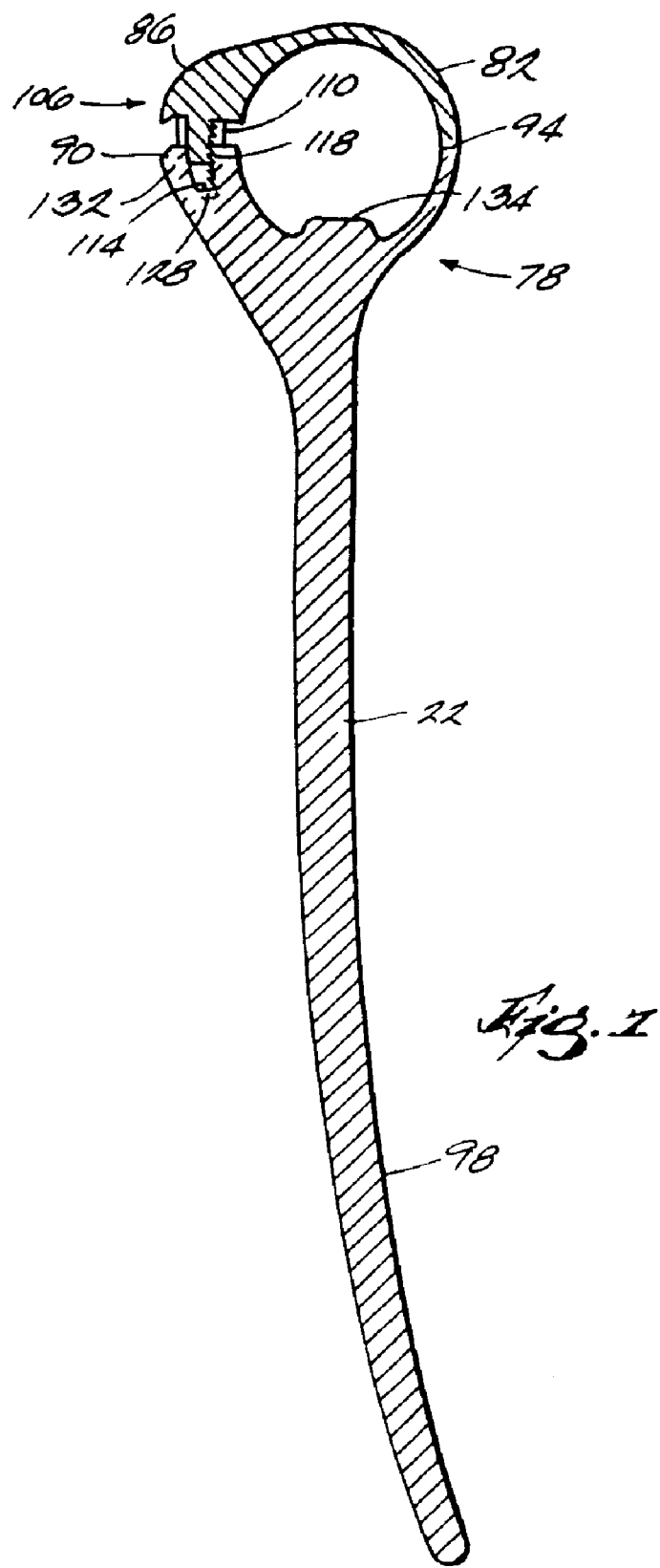

HARVESTER TINE AND BAT ASSEMBLY

RELATED APPLICATION

The present application claims the benefit of Provisional Application Ser. No. 60/346,583, filed on Jan. 8, 2002.

FIELD OF THE INVENTION

The present invention relates to harvesters and, more particularly, to a harvester tine and bat tube assembly.

BACKGROUND OF THE INVENTION

A typical harvester includes a harvester platform including a frame supported for movement over ground, the frame having a front edge, a cutter bar extending along the front edge, and a pickup reel for lifting up crop into the harvester. In general, the pickup reel includes a reel support supported by the frame, a reel shaft rotatably supported by the reel support and extending along an axis transverse to the frame, and a plurality of arms extending radially from and being rotatable with the shaft. The pickup reel also includes a plurality of second shafts or bat tubes, each supported by at least one arm and being generally parallel to and radially spaced from the reel shaft, the bat tubes being rotatable relative to and rotatable with the arm, and a plurality of harvester tines supported by each bat tube for movement with the bat tube. During operation of the pickup reel, the tine engages crop and lifts it into the harvester.

In some constructions, the tine includes a split ring portion to clamp the tine to the bat tube. The split ring portion extends around the bat tube, and a self-threading screw is threaded into the end portions of the split ring portion to clamp the tine to the bat tube.

SUMMARY OF THE INVENTION

One independent problem with the above-described harvester tine is that, during assembly, the self-threading screws occasionally strip the tine, rendering the tine useless.

Another independent problem with the above-described harvester tine is that, in service, removal and replacement of the tine requires a tool, such as a nut driver or wrench, to remove the tine from the bat tube. Even with such a tool, removal and replacement of the tine in the field is very difficult.

The present invention provides a harvester tine and bat tube assembly which alleviates one or more of these and other problems with the above-described harvester tines. In some aspects of the invention, the harvester tine and bat tube assembly includes an integrally-formed fastener assembly for connecting the tine to the bat tube. In some aspects of the invention, the harvester tine is connectable to the bat tube assembly without the use of separate fasteners.

In aspects of the invention, the fastener assembly includes snap-together fastener members. The snap-together fastener members are snapped together to connect the tine to the bat tube and are released by applying a lateral or sideways load to the snap-together portion. In such aspects, the snap-together fastener members are biased to the snapped-together or locked position and are moved to the release position against the biasing force.

More particularly, the present invention provides a combination for a harvester pickup reel including a second shaft or bat tube, a tine supportable on the bat tube for movement with the bat tube, and a fastener assembly including a first fastener member formed on one of the tine and the bat tube, and a second fastener member formed on one of the tine and bat tube. The first fastener member and the second fastener member are defined as being engageable to connect the tine to the bat tube. In some constructions, the tine is connected to the bat tube without separate fasteners.

In some constructions, the fastener assembly may be integrally formed with at least one of the tine and the bat tube. In such constructions, the fastener assembly is preferably integrally formed with the tine.

The first fastener member may be formed on a first portion of the tine, and the second fastener member may be formed on a second portion of the tine. Preferably, the tine includes a support portion engageable with the bat tube to support the tine on the bat tube, and finger portion extending from the support portion and engageable with crop during operation of the pickup reel. The support portion preferably provides the first and second portions of the tine.

The tine may include a split ring portion positionable to surround at least a portion of the bat tube, the split ring portion having a first end and a second end. The first fastener member is preferably adjacent the first end, and the second fastener member is preferably adjacent the second end. In some constructions, the split ring portion is positionable to substantially surround the bat tube so that the first end is engageable with the second end.

In some constructions, the first fastener member includes a projection, and the second fastener member includes a recess, the projection being engageable in the recess to connect the tine to the bat tube. The first fastener member may include first teeth, and the second fastener member may include second teeth engageable with the first teeth to prevent disengagement of the first fastener member from the second fastener member. The first and second teeth are preferably configured to allow the first fastener member to engage the second fastener member in a first direction from a unlocked position to a locked position and to prevent the first fastener member from being disengaged from the second fastener member in a second direction opposite to the first direction. Preferably, one of the fastener members includes a biasing portion biasing the first and second teeth into engagement.

The first fastener member is preferably movable relative to the second fastener member in a release direction transverse to the first direction from the locked position to a release position, in which the first fastener member is disengaged from the second fastener member. The first fastener member and the second fastener member may be biased by a biasing force towards the locked position, and the first fastener member may be moved relative to the second fastener member from the locked position to the release position against the biasing force. In some constructions, the tine includes a split ring portion having an intermediate portion, and the intermediate portion is flexible and applies the biasing force to maintain the fastener members in the locked position.

Preferably, the first fastener member is selectively engageable with the second fastener member to connect the tine with the bat tube. The first fastener member may be disengaged from the second fastener member to disconnect the tine from the bat tube and may then be re-engaged with the second fastener member to re-connect the tine to the bat tube or to connect the tine to another bat tube.

One of the bat tube and the tine may include a projection, and the other of the bat tube and the tine may define a recess. The projection is preferably received in the recess to prevent rotation of the tine relative to the bat tube. Preferably, the tine includes the projection, and the bat tube defines the recess. In some constructions, the tine includes a support portion engageable with the bat tube to support the tine on the bat tube, a finger portion extending from the support portion and engageable with crop during operation of the pickup reel, and a wing portion connected to and extending transversely out from the finger portion.

Also, the present invention provides a harvester tine for a harvester pickup reel, the tine including a support portion connectable with the bat tube to support the tine for movement with the bat tube, a fastener assembly integrally formed with the support portion and engageable to connect the support portion to the bat tube, and a tine portion extending from the support portion and engageable with crop during operation of the pickup reel.

In addition, the present invention provides a method of assembling a harvester tine and shaft assembly, the method comprising the acts of providing a shaft or bat tube, providing a harvester tine supportable on the shaft for movement with the shaft, at least one of the shaft and the tine providing a fastener assembly for connecting the tine to the shaft, the fastener assembly including a first fastener member and a second fastener member, and engaging the first fastener member and the second fastener member to connect the tine to the shaft.

One independent advantage of the invention is that the snap-together feature replaces the self-threading screw, eliminating the possibility of the screw stripping the tine during assembly and thereby rendering the tine useless.

Another independent advantage of the invention is that the snap-together feature is locked and released without the use of separate tools. As a result, in service, removal and replacement of the tine is very simple, even in the field.

Other independent features and independent advantages of the present invention will become apparent to those skilled in the art upon review of the following detailed description, claims and drawings.

BRIEF DESCRIPTION OF THE DRAWINGS

FIG. 1 is a side view of a harvester including a harvester tine and bat tube assembly embodying the present invention.

FIG. 2 is a side view illustrating the harvester tine and bat tube assembly.

FIG. 3 is a side cross-sectional view of the tine shown in FIG. 2 and illustrating the fastener assembly in the locked position.

FIG. 7 is a cross-sectional view similar to that in FIG. 3 and illustrating the fastener assembly in the partially locked position.

Figure 4:
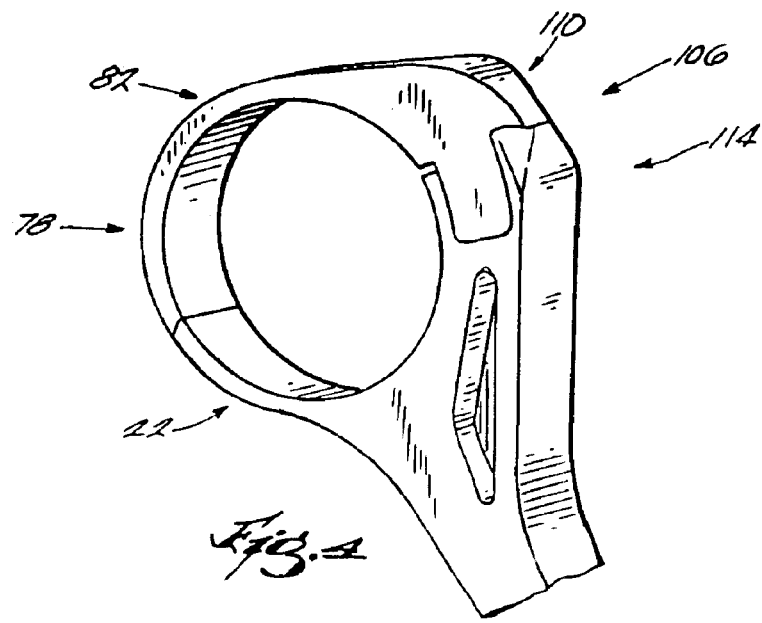
FIG. 4 is a perspective view of the tine shown in FIG. 2 and illustrating the fastener assembly in the locked position.

Before at least one embodiment of the invention is explained in detail, it is to be understood that invention is not limited in its application to the details of the construction and the arrangements of the components set forth in the following description or illustrated in a drawings. The invention is capable of other embodiments and of being practiced or carried out in various ways. Also, it is understood that the phraseology and terminology used herein is for the purpose of description and should not be regarded as limiting.

DETAILED DESCRIPTION

The harvester 10 including a pickup reel 14 and a harvester tine and bat tube assembly 18, embodying the invention, is illustrated in FIG. 1. In general, the assembly 18 includes a harvester tine 22 and a bat tube 26.

As shown in FIG. 1, the harvester 10 includes a harvester platform 28 including a platform frame 29, supported for movement over ground, and side and rear wall 30. A floor 34 extends between the opposite side walls 30, and a transverse crop converging auger 38 is rotatably supported above the floor 34 and forward of the rear wall 30. A transverse cutter bar 42 is mounted along the forward edge of the floor 34, and an upright crop dam 46 is supported between the cutter bar 42 and the floor 34.

The pickup reel 14 generally spans the width of the platform 28, forward of the auger 38 and above the cutter bar 42. The pickup reel 14 is connected to the platform 28 by a pair of reel support arms 50 (one shown) which support the pickup reel 14 on the frame 29. In illustrated construction, the support arms 50 are pivotally connected to the frame 29 at pivot points 54. The support arms 50 are generally above the sidewalls 30 of the platform 28. Preferably, the support arms 50 are selectively vertically adjustable by a pair of cylinders (not shown) connected between the support arms 50 and the sidewalls 30.

A movable support structure 58 is supported at the forward end of each support arm 50. The support structures 58 are generally slidable between forward and rearward positions on the support arm 50, and their movement is controlled by a pair of cylinders (not shown). The support arms 50 and the support structures 58 are adjustably positioned to adjust the position of the pickup reel 14 relative to the platform 28.

A tubular reel shaft or first shaft 62 is journalled by and extends between the support structures 58. The first shaft 62 is rotatable relative to the support structures 58 about its axis. A plurality of radially-extending members or spiders 66 are supported in axially-spaced relation on the first shaft 62 for rotation with the first shaft 62. Each spider 66 includes a plurality of radially-extending arms 70 (six in the illustrated construction) which are axially aligned with the arms 70 on the adjacent spider 66 to form sets of arms 70.

A transverse rock shaft, second shaft or bat tube 26 is journalled in the outer ends of each set of arms 70. The bat tubes 26 are rotatable with the associated arms 70 and, in the illustrated construction, are rotatable relative to the associated arms 70. The bat tubes 26 span the width of the pickup reel 14 and are generally parallel to and radially-spaced from the first shaft 62. A plurality of harvester tines 22 are connected to each bat tube 26 for movement with the bat tube 26 (in the illustrated construction, for rotation relative to the first shaft 62 and relative to the associated arms 70).

In illustrated construction, the pickup reel 14 also includes a cam path arrangement 74 to provide a control mechanism which enables the tip path of the tines 22 to be varied and optimized. In the illustrated construction, the cam path arrangement 74 is similar to that disclosed in co-pending U.S. patent application Ser. No. 10/102,164, filed Mar. 20, 2002, which is hereby incorporated by reference. It should be understood that, in other constructions (not shown), the pickup reel 14 may include a different cam path arrangement or may not include a cam path arrangement.

As shown in more detail and FIGS. 2–6, each tine 22 includes a support portion 78, which is engageable with the bat tube 26, to support the tine 22 on the bat tube 26. The support portion 78 includes a split ring portion 82 which is positionable to surround at least a portion of the circumference of the bat tube 26. In the illustrated construction, the split ring portion 82 is positionable to substantially surround the bat tube 26 so that a first end 86 and a second end 90 of the split ring portion 82 are engageable.

Figure 9:
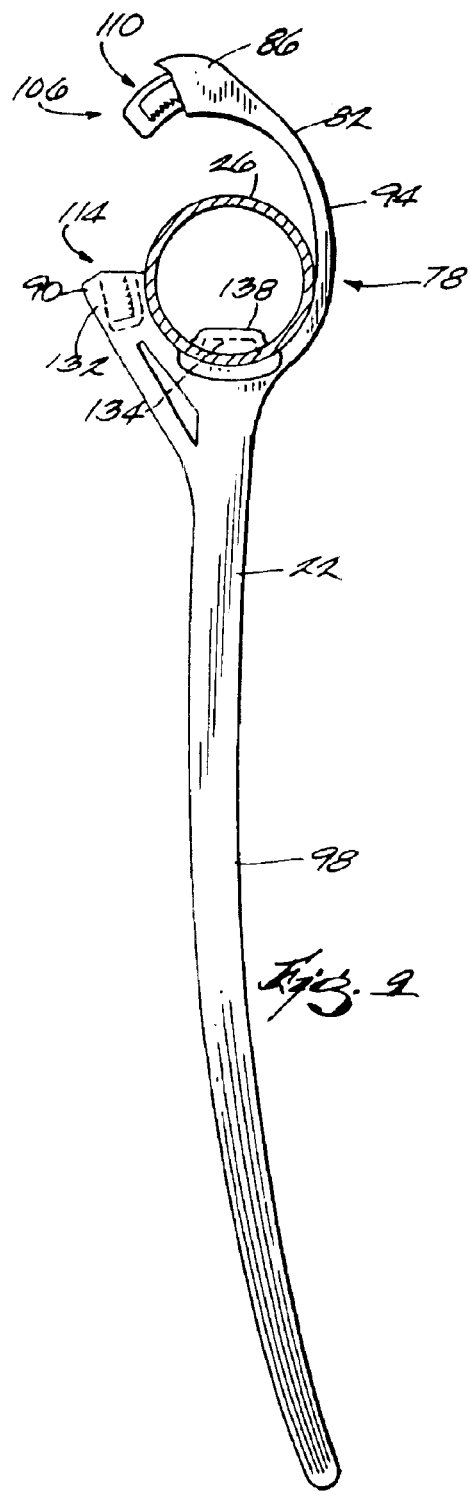
FIG. 9 is a side view of the harvester tine and bat tube assembly and illustrating the fastener assembly in the unlocked position.
Figure 8:
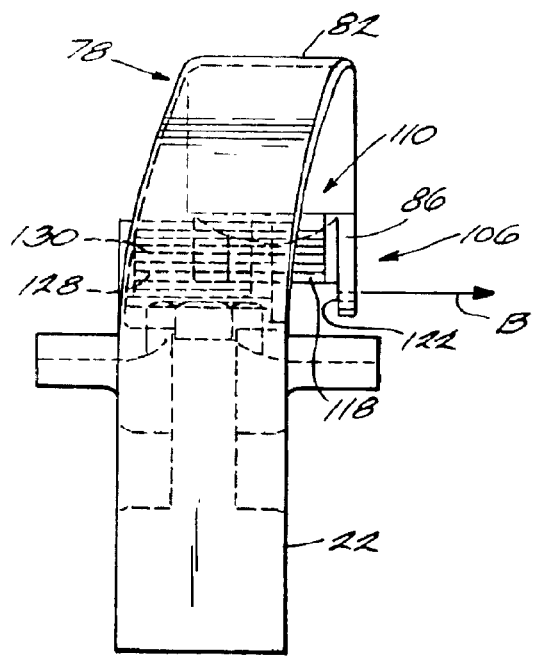
FIG. 8 is a front view of the harvester tine and illustrating the fastener assembly being moved to the release position.

The split ring portion 82 also includes an intermediate portion 94 between the ends 86 and 90. Preferably, the intermediate portion 94 is flexible so that the ends 86 and 90 can be separated (see FIG. 9) to allow the split ring portion 82 to be placed on and around at least a portion of the bat tube 26. The intermediate portion 94 also allows the ends 86 and 90 to be axially flexed relative to one another (see FIG. 8). However, the intermediate portion 94 is resilient enough to bias the ends 86 and 90 from an unlocked position (shown in FIG. 9) and from a release position (shown in FIG. 8) to a locked position (shown in FIGS. 2–4).

As shown in FIGS. 2–3, the tine 22 also includes a finger portion 98 extending from the support portion 78. The finger portion 98 is engageable with crop (not shown) during operation of the pickup reel 14. The tine 22 may also include (see FIG. 2) a wing portion 102 connected to and extending transversely out from the finger portion 98.

As shown in FIGS. 2–6, the assembly 18 also includes a fastener assembly 106 for connecting the tine 22 to the bat tube 26. In construction illustrated in FIGS. 1–9, the tine 22 is connected to the bat tube 26 without separate fasteners. Also, in the construction illustrated in FIGS. 1–9, the fastener assembly 106 is integrally formed with at least one of the tine 22 and the bat tube 26. In this construction, the fastener assembly 106 is integrally formed with the tine 22. As explained below in more detail, the fastener assembly 106 releasably connects the tine 22 to the bat tube 26.

The fastener assembly 106 includes a first fastener member 110 formed on a first portion of the support portion 78, such as adjacent the first end 86, and second fastener member 114 formed on a second portion of the support portion 78, such as adjacent the second end 90.

Figure 5:
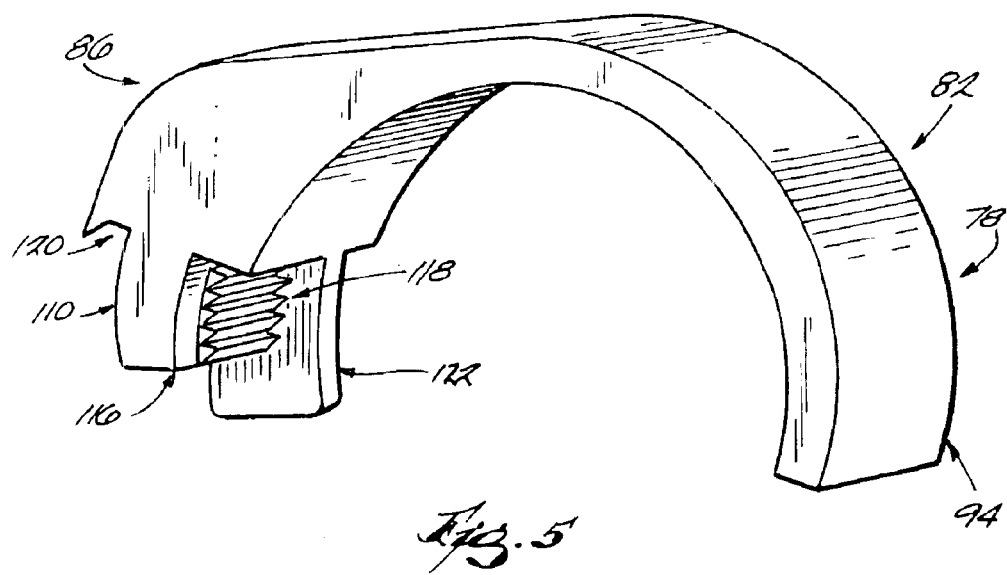
FIG. 5 is a perspective view of a portion of the harvester tine illustrated in FIG. 4.

The first fastener member 110 is illustrated in more detail in FIG. 5. The first fastener member 110 includes a projection 116 on which first teeth 118 are formed. The teeth 118 extend generally transversely across the projection 116 and are generally parallel to the axis of the bat tube 26. The first fastener member 110 also includes a base surface 120, generally oriented in radial plane, and a lateral surface 122 extending along the projection 116.

Figure 6:
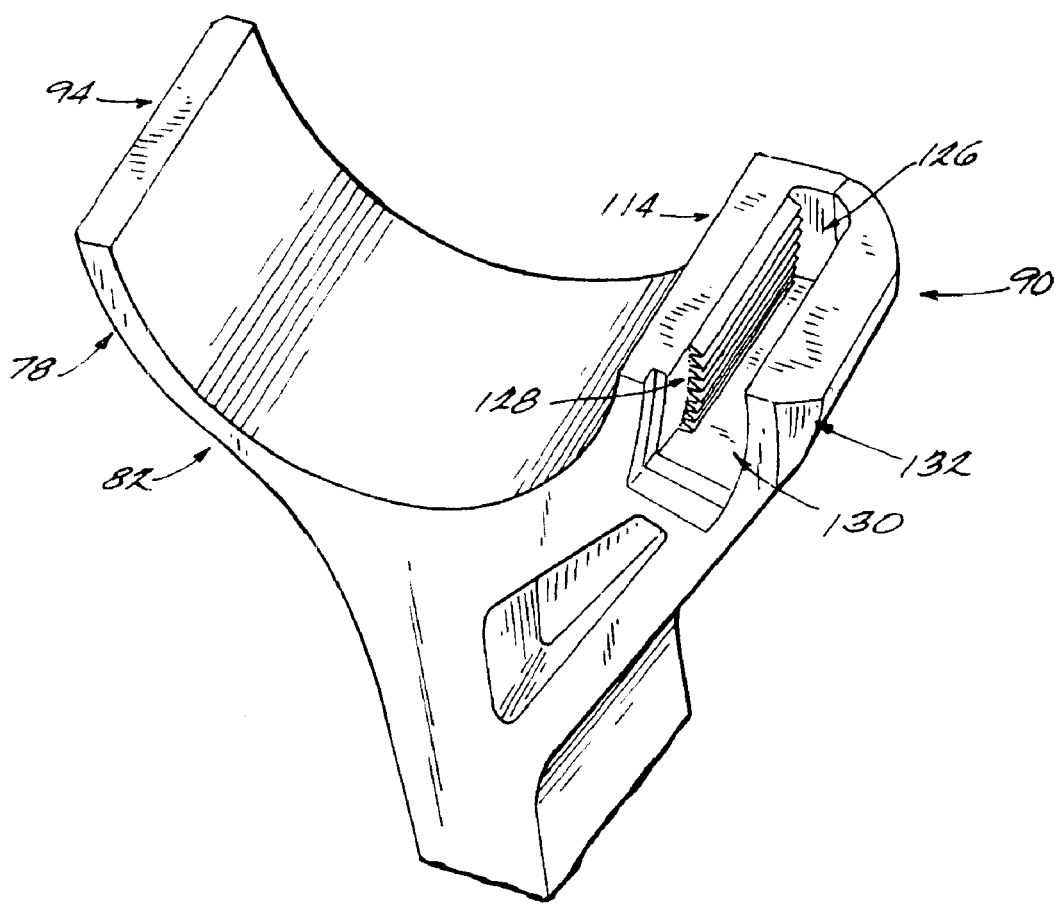
FIG. 6 is a perspective view of another portion of the harvester tine illustrated in FIG. 4.

The second fastener member 114 is illustrated in more detail in FIG. 6. The second fastener member 114 defines a recess 126 in which second teeth 128 are formed. The teeth 128 extend generally transversely to the recess 126 and generally parallel to the axis of the bat tube 26. The second teeth 128 are complementary to and engageable with the first teeth 118.

In the illustrated construction, the second fastener member 114 includes an inner surface 130, generally oriented in a radial plane. The second fastener member 114 also includes a biasing member 132 defining the portion of the recess 126 opposite to the teeth 128. The recess 126 is generally open in a circumferential direction at the second end 90 of the support portion 78 and on one axial side.

FIGS. 2–4 illustrate the locked position of the fastener assembly 106. In the locked position, the projection 116 is fully inserted into the recess 126 so that the forward end of the projection 116 engages the inner surface 130 of the recess 126 and so that the second end 90 engages the base surface 120 of the first fastener member 110. As shown in FIGS. 4–5, the teeth 118 and 128 are configured to allow movement of the fastener members 110 and 114 from the unlocked position (shown in FIG. 9), through a partially locked position (shown in FIG. 7) and to the locked position (shown in FIGS. 2–4). The teeth 118 and 128 are oriented at a relatively shallow angle to allow movement in a first direction (indicated by arrow A in FIGS. 2–3).

In the illustrated construction, the rearward faces of the teeth 118 and 128 are oriented at a steep angle relative to arrow A (preferably in a radial plane) to prevent the fastener members 110 and 114 from moving from the locked position in a second direction opposite to arrow A. In the locked position (shown in FIGS. 2–4), the teeth 118 and 128 engage to prevent disengagement of the fastener members 110 and 114, and the biasing portion 132 biases the teeth 118 and 128 into such a locking engagement.

In the illustrated construction, to disengage the fastener members 110 and 114 and to remove the tine 22 from the bat tube 26, the fastener members 110 and 114 are movable relative to one another, against the biasing force of the intermediate portion 94, in a release direction (indicated by arrow B in FIG. 8) transverse to the first direction from the locked position (shown in FIGS. 2–4) to the release position (shown in FIG. 8), in which the fastener members 110 and 114 are disengaged. The projection 116 of the first fastener member 110 moves out of the recess 126 of the second fastener member 114 though the open axial side of the recess 126. The split ring portion 82 may then be flexed, against the bias of the intermediate portion 94, to move the ends 86 and 90 apart so that the tine 22 may be removed from the bat tube 26. The intermediate portion 94 thus biases the fastener members 110 and 114 to the locked position.

It should be understood that, in other constructions (not shown), the fastener members 110 and 114 may be selectively prevented from moving from the locked position in the second direction opposite to arrow A. In such constructions, the fastener members 110 and 114 may be allowed to selectively move from the locked position in the second direction to disengage the fastener members 110 and 114 and to remove the tine 22 from the bat tube 26.

For example, one fastener member (such as fastener member 110) may provide a projection (not shown) having movable teeth (not shown), and the other fastener member (such as the fastener member 114) may provide an opening (not shown) having a surface (not shown) with which the teeth are selectively engageable. In the locked position, the teeth engage the surface to prevent relative movement of the fastener members from the locked position in the second direction. The teeth are movable (for example, by movement of the teeth relative to the projection, by flexing of the teeth relative to the projection, by rotation of one fastener member relative to the other fastener member, etc.) out of engagement with the surface to allow relative movement of the fastener members from the locked position in the second direction to disengage the fastener members.

As shown in FIG. 2, the assembly 18 also includes an arrangement for preventing rotation of the tine 22 relative to the bat tube 26. In the illustrated construction, the arrangement includes a projection 134 formed on the inner surface of the split ring 82 and engageable with a recess 138 formed on the outer surface of the bat tube 26. When the projection 134 engages the recess 138, the tine 22 is prevented from rotating relative to the bat tube 26.

Figure 10:
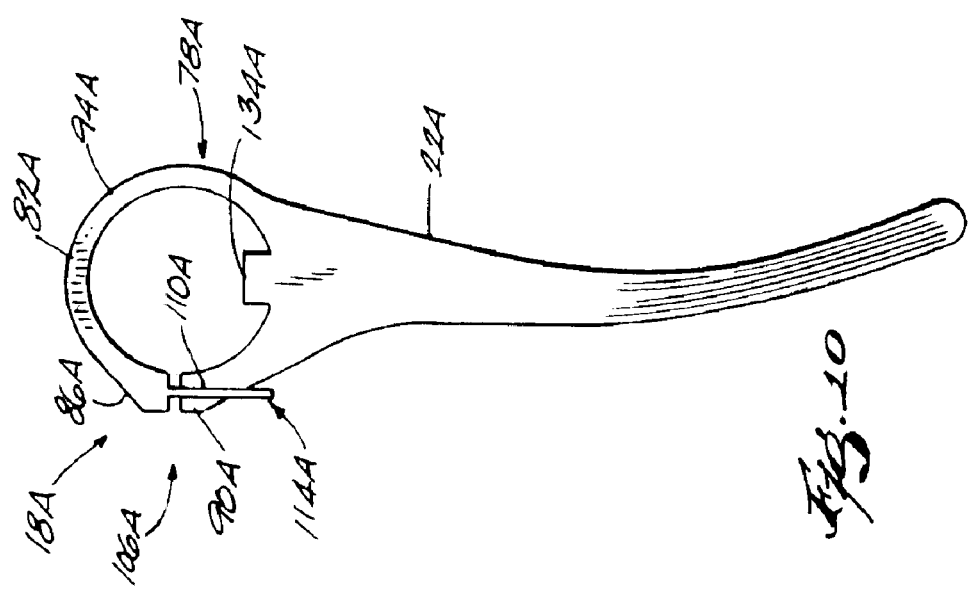
FIG. 10 is a side view of a first alternative construction of the harvester tine and bat tube assembly.

FIG. 10 illustrates a first alternative construction of a harvester tine and bat tube assembly 18A. Common elements are identified by the same reference number "A".

As shown in FIG. 10, the first fastener member 110A is a ratchet-type fastener, similar to a cable tie. The first fastener member 110A is inserted into the second fastener member 114A to connect the fastener assembly 106A. The inner circumferential end of the recess 126A is open to allow the projection 116A to extend into and through the recess 126A.

The fastener assembly 106A includes a biasing member (not shown) biasing inter-engaging teeth (not shown) on the fastener members 110A and 114A into engagement to prevent the fastener members 110A and 114A from being disengaged and to retain the fastener assembly 106A in the locked condition. The biasing member may be formed on either of the fastener members 110A and 114A.

To release the fastener assembly 106A, the biasing member is moved to a position in which the biasing force is not applied to force the inter-engaging teeth into engagement. The first fastener member 110A may then be removed from the second fastener member 114A, and the tine 22A may be removed from the bat tube (not shown).

It should be understood that, in other constructions (not shown), one fastener member (such as fastener member 110A) may provide a projection (not shown) having movable teeth (not shown), and the other fastener member (such as the fastener member 114A) may provide an opening (not shown) having a surface (not shown) with which the teeth are selectively engageable. In the locked position, the teeth engage the surface to prevent relative movement of the fastener members from the locked position in the second direction. The teeth are movable (for example, by movement of the teeth relative to the projection, by flexing of the teeth relative to the projection, by rotation of one fastener member relative to the other fastener member, etc.) out of engagement with the surface to allow relative movement of the fastener members from the locked position in the second direction to disengage the fastener members.

In an alternative construction (not shown), the split ring portion 82 of the tine 22 may extend around only a portion of the circumference of the bat tube 26. In such a construction, the ends 86 and 90 of the split ring portion 82 do not engage. Rather, the first fastener member 110 extends through an opening in the bat tube 26 to engage the second fastener member 114 on the other side of the bat tube 26. Such an engagement also provides a rotation preventing arrangement.

In another alternative construction (not shown), the opening in the bat tube 26 may provide a second fastener member, and the first fastener member 110 may engage the opening to connect the tine 22 to the bat tube 26. In such a construction, a portion of the fastener assembly 106 is provided by the bat tube 26 and another portion of the fastener assembly 106 is provided by the tine 22.

Figure 11:
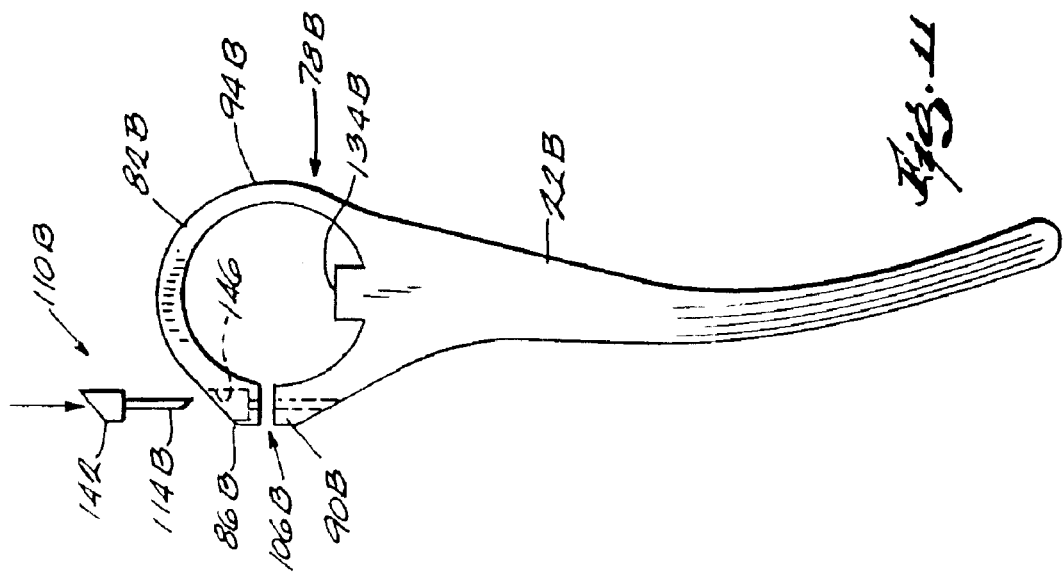
FIG. 11 is a side view of a second alternative construction of the harvester tine and bat tube assembly.

Yet another alternative construction of the harvester tine and bat tube assembly 18B is illustrated in FIG. 11. Common elements are identified by the same reference number "B".

As shown in FIG. 11, the fastener assembly 106B includes a separate fastener 142 providing the first fastener member 10B. The first end 86B of the split ring portion 82B defines a recess 146 into which the separate fastener 142 is seated. The separate fastener 142 includes the projection 116B which engages in the recess 126B of the second fastener member 114B to connect the tine 22B to the bat tube (not shown). The separate fastener 142 includes a ratchet portion.

In another construction (not shown), a separate second fastener member (not shown) may be provided and may engage the second end 90B to replace the integrally-formed second fastener member 114B.

It should be understood that, in other constructions (not shown), the fastener members 110B and 114B may be selectively prevented from moving from the locked position in the second direction opposite to arrow A. In such constructions, the fastener members 110B and 114B may be allowed to selectively move from the locked position in the second direction to disengage the fastener members 110B and 114B and to remove the tine 22B from the bat tube 26B.

For example, one fastener member (such as fastener member 110B) may provide a projection (not shown) having movable teeth (not shown), and the other fastener member (such as the fastener member 114B) may provide an opening (not shown) having a surface (not shown) with which the teeth are selectively engageable. In the locked position, the teeth engage the surface to prevent relative movement of the fastener members from the locked position in the second direction. The teeth are movable (for example, by movement of the teeth relative to the projection, by flexing of the teeth relative to the projection, by rotation of one fastener member relative to the other fastener member, etc.) out of engagement with the surface to allow relative movement of the fastener members from the locked position in the second direction to disengage the fastener members.

In constructions illustrated in FIGS. 1–10 and in some aspects of the invention, the tine 22 is connected to the bat tube 26 without separate fasteners.

In the constructions illustrated in FIGS. 1–10 and in some aspects of the invention, the fastener assembly 106 is integrally formed with at least one of the tine 22 and the bat tube 26. In the constructions illustrated in FIGS. 1–10, the fastener assembly 106 is integrally formed with the tine 22. In other constructions (not shown), a portion of the fastener assembly 106 (such as the first fastener member 110) is provided by the tine 22 and another portion of the fastener assembly 106 (such as the second fastener member 114) is provided by the bat tube 26.

It should be understood that, in other constructions (not shown), the integral fastener assembly may be provided by other structure, such as, for example, by adhesive formed with at least one of the tine 22 and the bat tube 26.

In some constructions, the fastener member 106 provides a snap-together feature for the harvester tine and bat tube assembly 18 which enables the tine 22 to be easily connected to and removed from the bat tube 26 during assembly and in the field.

One or more independent features and independent advantages of the invention are set forth in the following claims:

I claim:

1. A combination for a harvester pickup reel, the pickup reel including a support, a shaft rotatably supported by the support, and an arm extending radially from the shaft and rotatable with the shaft, said combination comprising:

a second shaft supported by the arm for rotation with the arm;

a tine supportable on the second shaft for rotation with the second shaft;

a fastener assembly including
a first fastener member including a projection, and
a second fastener member defining a recess, the projection being insertable into the recess in a first direction to engage the first fastener member and the second fastener member and to connect the tine to the second shaft, the projection being selectively prevented from disengaging the recess in a second direction opposite to the first direction;
wherein the first fastener member is movable relative to the second fastener member in a release direction transverse to the first direction to disengage the first fastener member and the second fastener member;
wherein the first fastener member includes first teeth, wherein the second fastener member includes second teeth engageable with the first teeth in the first direction to prevent disengagement of the first fastener member and the second fastener member in the second direction, and wherein the first teeth and second teeth are disengageable in the release direction; and
wherein the tine is connected to the second shaft without separate fasteners.

2. The combination as set forth in claim 1 wherein the projection is selectively disengageable from the recess in the second direction.

3. The combination as set forth in claim 1 wherein the fastener assembly is integrally formed with at least one of the tine and the second shaft.

4. The combination as set forth in claim 3 wherein the fastener assembly is integrally formed with the tine.

5. The combination as set forth in claim 1 wherein the tine is connected to the second shaft without separate fasteners.

6. The combination as set forth in claim 1 wherein the first fastener member is formed on a first portion of the tine, and wherein the second fastener member is formed on a second portion of the tine.

7. The combination as set forth in claim 6 wherein the tine includes a support portion engageable with the second shaft to support the tine on the second shaft, and a finger portion extending from the support portion and engageable with crop during operation of the pickup reel, wherein the support portion provides the first portion of the tine and the second portion of the tine, wherein the tine includes a split ring portion positionable to surround at least a portion of the second shaft, the split ring portion having a first end and a second end, the first fastener member being adjacent the first end, the second fastener member being adjacent the second end, and wherein the split ring portion is positionable to substantially surround the second shaft so that the first end is engageable with the second end.

8. The combination as set forth in claim 1 wherein the first fastener member and the second fastener member are biased by a biasing force toward the locked position, wherein the first fastener member is moved relative to the second fastener member from the locked position to the release position against the biasing force, and wherein the tine includes a split ring portion positionable to surround at least a portion of the second shaft, the split ring portion having a first end, a second end and an intermediate portion between the first end and the second end, wherein the first fastener member is adjacent the first end, and the second fastener member is adjacent the second end, and wherein the intermediate portion is flexible and applies the biasing force to maintain the first fastener member and the second fastener member in the locked position.

9. The combination as set forth in claim 1 wherein the first fastener member is selectively engageable with the second fastener member to connect the tine to the second shaft, and wherein the first fastener member is disengageable from the second fastener member to disconnect the tine from the second shaft and is then reengageable with the second fastener member to connect the tine to a second shaft.

10. A harvesting tine for a harvester pickup reel, the pickup reel including a support, a first shaft rotatably supported by the support, an arm extending radially from the first shaft and rotatable with the first shaft, and a second shaft supported by the arm for rotation with the arm, the second shaft being generally parallel to and radially-spaced from the first shaft, said tine comprising:
a support portion connectable with the second shaft to support said tine for rotation with the second shaft;
a fastener assembly integrally formed with the support portion and engageable to connect the support portion to the second shaft;
a tine portion extending from the support portion and being engageable with crop during operation of the pickup reel;
wherein the fastener assembly includes a first fastener member formed on a first portion of the tine, and a second fastener member formed on a second portion of the tine, the first fastener member and the second fastener member being engageable to connect the tine to the second shaft;
wherein the first fastener member includes first teeth, the second fastener member includes second teeth engageable with the first teeth to prevent disengagement of the first fastener member from the second fastener member, and wherein the first teeth and the second teeth are configured to allow the first fastener member to engage the second fastener member in a first direction from an unlocked position, in which the tine is not fixed to the second shaft, to a locked position, in which the tine is connected to the second shaft, and to prevent the first fastener member from disengaging the second fastener member in a second direction opposite to the first direction; and
wherein the tine is connected to the second shaft without separate fasteners.

11. The tine as set forth in claim 10 further comprising a split ring portion positionable to surround at least a portion of the second shaft, the split ring portion having a first end and a second end, the first fastener member being adjacent the first end, the second fastener member being adjacent the second end.

12. The tine as set forth in claim 11 wherein the split ring portion is positionable to substantially surround the second shaft so that the first end is engageable with the second end.

13. The tine as set forth in claim 10 wherein the first fastener member includes a projection, and wherein the second fastener member includes a recess, the projection being engageable in the recess to connect the tine to the second shaft.

14. The tine as set forth in claim 10 wherein one of the first fastener member and the second fastener member includes a biasing portion biasing the first teeth and the second teeth into engagement.

15. The tine as set forth in claim 10 wherein the first fastener member is movable relative to the second fastener member in a release direction transverse to the first direction from the locked position to a release position, in which the first fastener member is disengaged from the second fastener member.

16. The tine as set forth in claim 15 wherein the first fastener member and the second fastener member are biased by a biasing force toward the locked position, and wherein the first fastener member is moved relative to the second fastener member from the locked position to the release position against the biasing force.

17. The tine as set forth in claim 16 wherein the tine includes a split ring portion positionable to surround at least a portion of the second shaft, the split ring portion having a first end, a second end and an intermediate portion between the first end and the second end, wherein the first fastener member is adjacent the first end, and the second fastener member is adjacent the second end, and wherein the intermediate portion is flexible and applies the biasing force to maintain the first fastener member and the second fastener member in the locked position.

18. The tine as set forth in claim 10 wherein the first fastener member is selectively engageable with the second fastener member to connect the tine to the second shaft.

19. The tine as set forth in claim 18 wherein the first fastener member is disengageable from the second fastener member to disconnect the tine from the second shaft and is then reengageable with the second fastener member to connect the tine to a second shaft.

20. A combination for a harvester pickup reel, the pickup reel including a support, a first shaft rotatably supported by the support, an arm extending radially from the first shaft and rotatable with the first shaft, and a second shaft supported by the arm for rotation with the arm, the second shaft being generally parallel to and radially-spaced from the first shaft, said combination comprising:
a tine supportable on the second shaft for rotation with the second shaft;
a fastener assembly including
a first fastener member including a projection, and
a second fastener member defining a recess, the projection being insertable into the recess in a first direction to engage the first fastener member and the second fastener member and to connect the tine to the second shaft, the projection being selectively prevented from disengaging the recess in a second direction opposite to the first direction;
wherein the fastener assembly is integrally formed with the tine; and
wherein the tine is connected to the second shaft without separate fasteners.

21. The combination as set forth in claim 20 wherein the fastener assembly is separate from the tine.

22. The combination as set forth in claim 20 wherein the projection is selectively disengageable from the recess in the second direction.

23. The combination as set forth in claim 20 wherein the first fastener member is formed on a first portion of the tine, and wherein the second fastener member is formed on a second portion of the tine.

24. The combination as set forth in claim 20 wherein the first fastener member is movable relative to the second fastener member in a release direction transverse to the first direction to disengage the first fastener member and the second fastener member.

25. The combination as set forth in claim 24 wherein the first fastener member includes first teeth, wherein the second fastener member includes second teeth engageable with the first teeth in the first direction to prevent disengagement of the first fastener member and the second fastener member in the second direction, and wherein the first teeth and second teeth are disengageable in the release direction.

26. The combination as set forth in claim 20 wherein the first fastener member is selectively engageable with the second fastener member to connect the tine to the second shaft, and wherein the first fastener member is disengageable from the second fastener member to disconnect the tine from the second shaft and is then reengageable with the second fastener member to connect the tine to a second shaft.

27. A harvester pickup reel comprising:
a support;
a shaft rotatably supported by the support;
an arm extending radially from the shaft and rotatable with the shaft;
a second shaft supported by the arm for rotation with the arm;
a tine supportable on the second shaft for rotation with the second shaft;
a fastener assembly including
a first fastener member formed on the tine, and
a second fastener member formed on the tine, the first fastener member and the second fastener member being engageable to connect the tine to the second shaft;
wherein the first fastener member includes first teeth, and the second fastener member includes second teeth engageable with the first teeth to prevent disengagement of the first fastener member from the second fastener member, wherein the first teeth and the second teeth are configured to allow the first fastener member to engage the second fastener member in a first direction from an unlocked position, in which the tine is not fixed to the second shaft, to a locked position, in which the tine is connected to the second shaft, and to prevent the first fastener member from disengaging the second fastener member in a second direction opposite to the first direction, and wherein the first fastener member is movable relative to the second fastener member in a release direction transverse to the first direction from the locked position to a release position, in which the first fastener member is disengaged from the second fastener member; and
wherein the tine is connected to the second shaft without separate fasteners.

28. The reel as set forth in claim 27 wherein the tine includes a split ring portion positionable to surround at least a portion of the second shaft, the split ring portion having a first end and a second end, the first fastener member being adjacent the first end, the second fastener member being adjacent the second end.

29. The reel as set forth in claim 28 wherein the split ring portion is positionable to substantially surround the second shaft so that the first end is engageable with the second end.

30. The reel as set forth in claim 28 wherein the tine is connected to the second shaft without separate fasteners.

31. The reel as set forth in claim 27 wherein the first fastener member is formed on a first portion of the tine, and wherein the second fastener member is formed on a second portion of the tine.

32. The reel as set forth in claim 31 wherein the tine includes a support portion engageable with the second shaft to support the tine on the second shaft, and a finger portion extending from the support portion and engageable with crop during operation of the pickup reel, wherein the support portion provides the first portion of the tine and the second portion of the tine.

33. The reel as set forth in claim 27 wherein the first fastener member includes a projection, and wherein the second fastener member includes a recess, the projection being engageable in the recess to connect the tine to the second shaft.

34. The reel as set forth in claim 27 wherein the first fastener member and the second fastener member are biased by a biasing force toward the locked position, wherein the first fastener member is moved relative to the second fastener member from the locked position to the release position against the biasing force, and wherein the tine includes a split ring portion positionable to surround at least a portion of the second shaft, the split ring portion having a first end, a second end and an intermediate portion between the first end and the second end, wherein the first fastener member is adjacent the first end, and the second fastener member is adjacent the second end, and wherein the intermediate portion is flexible and applies the biasing force to maintain the first fastener member and the second fastener member in the locked position.

35. The reel as set forth in claim 27 wherein the first fastener member is selectively engageable with the second fastener member to connect the tine to the second shaft, and wherein the first fastener member is disengageable from the second fastener member to disconnect the tine from the second shaft and is then reengageable with the second fastener member to connect the tine to a second shaft.

36. The reel as set forth in claim 27 wherein one of the second shaft and the tine includes a projection, and wherein the other of the second shaft and the tine defines a recess, the projection being received in the recess to prevent rotation of the tine relative to the second shaft.

37. The reel as set forth in claim 36 wherein the tine includes the projection, and the second shaft defines the recess.

38. The reel as set forth in claim 27 wherein the tine includes a support portion engageable with the second shaft to support the tine on the second shaft, a finger portion extending from the support portion and engageable with crop during operation of the pickup reel, and a wing portion connected to and extending transversely out from the finger portion.

* * * * *